March 28, 1950     W. C. RHODES     2,501,740
AUTOMOBILE ARMREST PROTECTOR
Filed March 15, 1949     2 Sheets-Sheet 1
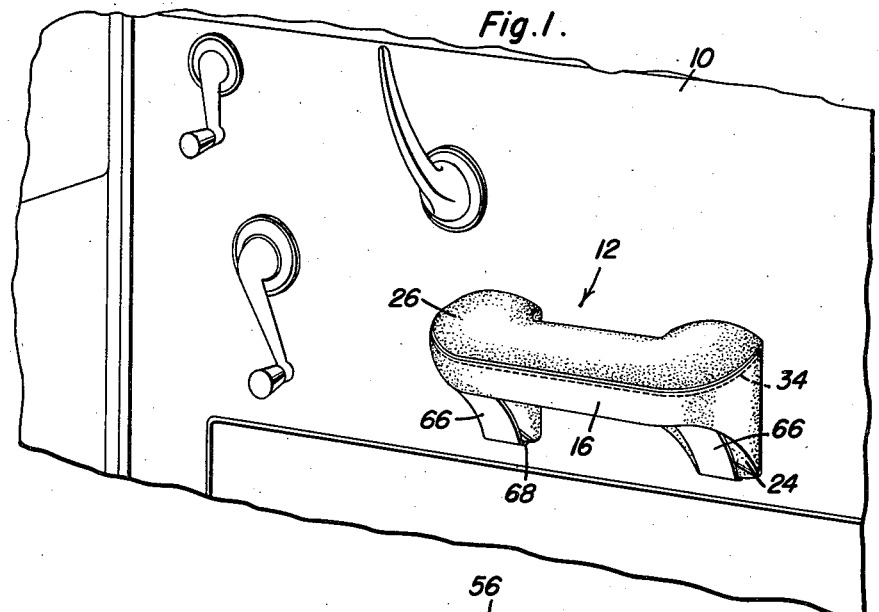
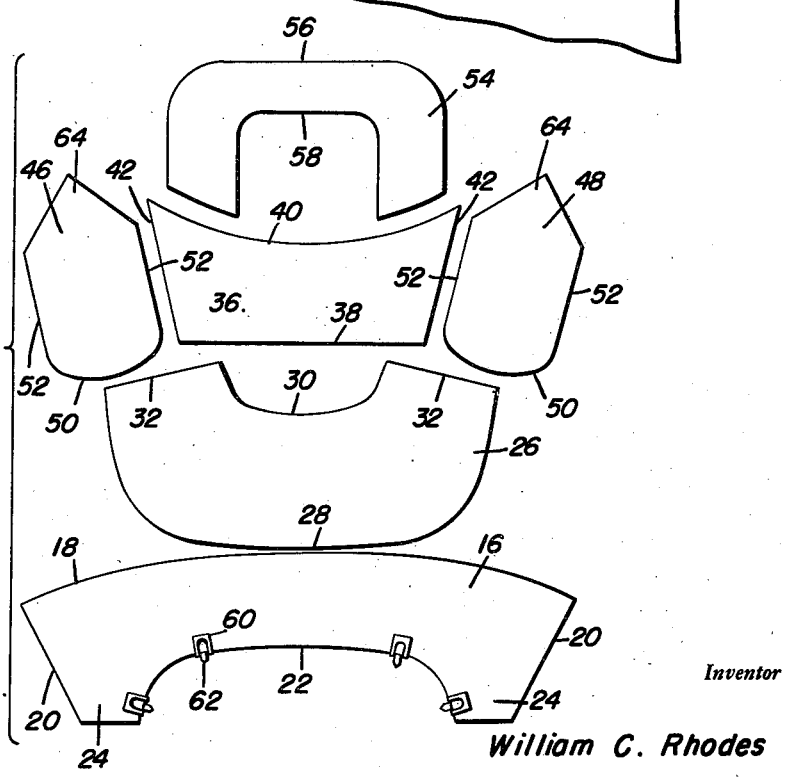
Inventor
William C. Rhodes
By Clarence A. O'Brien
and Harvey B. Jacobson
Attorneys March 28, 1950 W. C. RHODES 2,501,740
AUTOMOBILE ARMREST PROTECTOR
Filed March 15, 1949 2 Sheets-Sheet 2

Inventor
William C. Rhodes
By *Clarence A. O'Brien and Harvey B. Jacobson*
Attorney.

Patented Mar. 28, 1950

2,501,740

UNITED STATES PATENT OFFICE 2,501,740

AUTOMOBILE ARMREST PROTECTOR

William C. Rhodes, San Angelo, Tex.

Application March 15, 1949, Serial No. 81,443

5 Claims. (Cl. 155—182)

This invention relates to a protector for the generally U-shaped arm rest in automotive vehicles and has for its primary object to enable one to readily attach and remove a protective covering to the arm rest with a minimum of effort and with virtually no chance that the protector will not sufficiently embrace the arm.

Another object of this invention is to provide a cover or protector of the character described which is fabricated of six separable panels which can be readily secured together, as by sewing, to provide a closure which will snugly fit around both the body portion and the lateral projections of the arm rest.

Yet another object of this invention is to provide a cover fabricated of flexible material such as cloth, art leather, leather, plastics and the like which can be made with colors to harmonize or brighten up the inside trimming of the automobile.

Yet another object of this invention is to provide an arm rest including a substantially U-shaped body having lateral projections at its sides; a removable cover of flexible material embracing the body and lateral projections, said cover including separable sections, comprising a substantially U-shaped top piece, a front piece secured to said top piece and embracing the lateral projections, a back piece secured to said top piece, and means for joining said back and front pieces.

These, together with various ancillary objects and features of the invention which will later become apparent as the following description proceeds, are attained by the device, a preferred embodiment of which has been illustrated by way of example only in the accompanying drawings, wherein:

Figure 1 is a perspective view of the cover shown attached to an arm rest in an automotive vehicle;

Figure 2 is a group plan view of the six panels making up the cover;

Specific reference is now made to the drawings. In the several views in the accompanying drawings and in the following specification reference characters indicate corresponding elements throughout.

Figure 3:
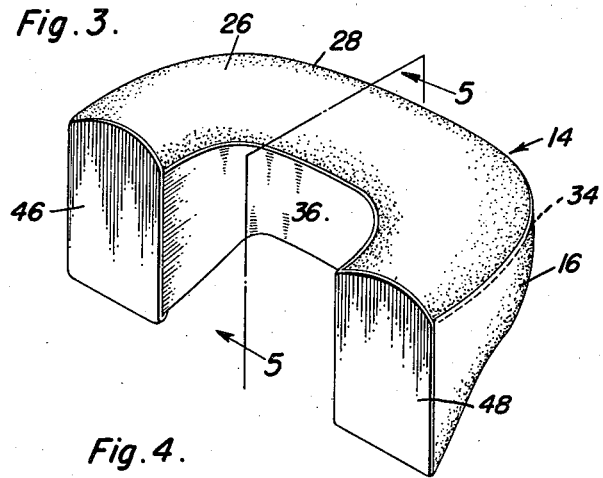
Figure 3 is a perspective view of the assembled cover looking from the rear thereof.
Figure 4:
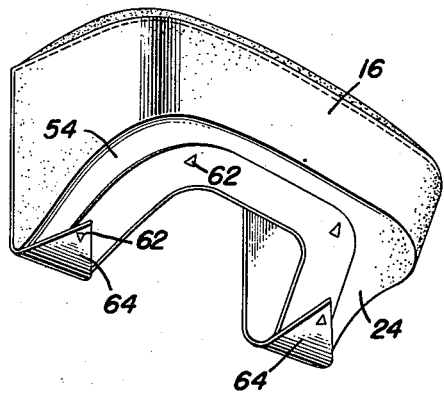
Figure 4 is a fragmentary perspective view of the assembled cover looking from the bottom on Figure 3.
Figure 5:
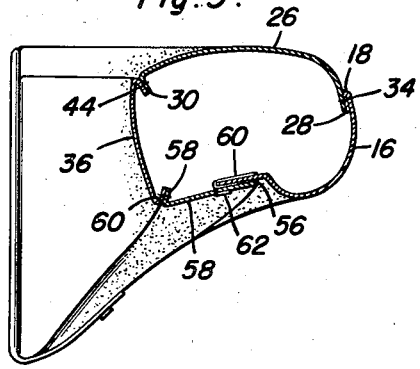
Figure 5 is a sectional view taken substantially on the plane of section line 5—5 of Figure 3.

Indicated generally at 10 is the interior wall of a door of a conventional automotive vehicle to which is removably secured by means of appropriate bolts or screws, an arm rest 12, which, as shown clearly in Figure 1, includes a substantially U-shaped body having lateral projections at the sides thereof. The type of arm rest contemplated is the one which serves also as a handle for pulling the door.

The protector or cover of the instant invention is indicated at 14 and is fabricated of suitable flexible material such as cloth, leather, plastics and the like. The actual construction of the cover will be described hereinafter with particular reference to Figure 2.

A front piece 16 is provided which is substantially U-shaped and which includes an upper arcuate longitudinal edge 18, side edges 20, and a lower longitudinal edge 22. By providing a substantially U-shaped member, it will be seen that the front piece includes lateral sections 24 which are adapted to abut the lateral side projections of the arm rest.

A top substantially U-shaped panel 26 is provided having an outer longitudinal edge 28, an inner longitudinal edge 30, and end edges 32. The edges 18 and 28 of the front and top panels respectively are preferably inturned and secured together by sewing as at 34.

A back panel 36 is provided having an upper longitudinal edge 38 and a lower longitudinal edge 40 as well as side edges 42. The edges 30 and 38 of the top and back panels respectively are inturned and secured together by sewing as at 44.

Two end panels 46 and 48 are provided each having upper edges 50 and side edges 52. The upper edges 50 of the end panels are inturned together with the end edges 32 of the top panel and secured together as by sewing.

The side edges 52 of each of the end panels are inturned with the side edges 42 of the back panel and the side edges 20 of the front panel and secured together by means of sewing.

Finally, a substantially U-shaped bottom panel 54 is provided having a rear peripheral or longitudinal edge 56 and a front peripheral or longitudinal edge 58. The longitudinal edge 58 of the bottom panel is inturned with the lower edge 40 of the back panel and secured together as by sewing. This assembly produces a cover or closure which can be readily slipped on the arm rest 12 after the latter has been removed from the interior wall 10. To complete the closure, a means is provided for detachably securing the front piece to the bottom panel and this means consists of a plurality of pressure clips 60 carried by the front piece adjacent the lower edge 22, each of the clips being provided with a bendable tongue 62 which is inserted in the bottom panel adjacent the edge 56 and bent down in a manner which will be readily understood. To insure that a close and snug fit results, the end panels 46 and 48 may be provided with extensions 64 which can be bent upwardly and received between the projecting portions of the front piece and the bottom member, one of the bendable tongues 62 passing through both the bottom panel and the extension 64.

In order to secure the assembled cover to the arm rest to prevent relative movement between the cover and the arm rest and consequently eliminate the possibility of wrinkling of the cover, a longitudinally extending resilient bar is provided which fits across the bottom edge 22 of the front panel and is secured to the arm through the cover any suitable means, such as screws (not shown). The bar will be provided with lateral projections 66 at the sides thereof, which projections abut the projecting portions 24 of the front piece. The projections 66 will further be provided with inturned lips 68 which are positioned beneath the lateral projections of the arm rest itself as shown clearly in Figure 1.

Thus it will be seen that a novel and extremely useful cover or protector is provided which is constructed of six essential flexible panels that may be readily assembled for positioning about the conventional U-shaped arm rest of an automotive vehicle. It will be understood that the cover may be readily constructed to fit different sizes and shapes of arm rests.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In an arm rest including a substantially U-shaped body having lateral projections at its sides; a removable cover of flexible material embracing the body and lateral projections, said cover including separable sections, said cover including a substantially U-shaped top piece, a front piece secured to said top piece and embracing the lateral projections, a back piece secured to said top piece, and means for joining said back and front pieces.

2. The combination of claim 1 wherein said means includes clips carried by said front piece and bendable tongues carried by said clips adapted to pierce and engage said back piece.

3. In an arm rest including a substantially U-shaped body having lateral projections at its sides; a removable cover of flexible material embracing the body and lateral projections, said cover including separable sections, and a resilient plate for anchoring said cover to the body to prevent relative movement of the cover with respect to the body.

4. In an arm rest including a substantially U-shaped body having lateral projections at its sides; a removable cover of flexible material embracing the body and lateral projections, said cover having six sections including a substantially U-shaped front panel having a longitudinal upper edge and side edges, a substantially U-shaped top panel having an outer longitudinal edge, an inner edge and end edges, said longitudinal edge of said front panel being secured to said outer edge of said top panel, a back panel having upper and lower longitudinal edges and side edges, said edge of said back panel being secured to said inner edge of said top panel, two end pieces each having upper edges and side edges, said upper edges of said end pieces being secured to said end edges of said top panel, said side edges of said end being pieces secured respectively to said side edges of said front panel and said back panel, a substantially U-shaped bottom panel having a rear longitudinal edge secured to said lower edge of said back member, and means for removably attaching said bottom panel to said front panel.

5. The combination of claim 4 wherein said end panels include lower extensions adapted to be folded beneath and secured to said bottom and said front panels.

WILLIAM C. RHODES.

REFERENCES CITED

The following references are of record in the file of this patent:

UNITED STATES PATENTS

| Number | Name | Date |
|---|---|---|
| 1,857,418 | Wedler | May 10, 1932 |